US012799035B2

(12) United States Patent
Martin et al.

(10) Patent No.: US 12,799,035 B2
(45) Date of Patent: Nov. 17, 2026

(54) PLASTER COMPOSITION FOR FIRE RESISTANT PLASTERBOARD

(71) Applicant: ETEX BUILDING PERFORMANCE INTERNATIONAL SAS, Avignon (FR)

(72) Inventors: Daniel Martin, Vedène (FR); Jean-Philippe Boisvert, Salon de Provence (FR)

(73) Assignee: ETEX BUILDING PERFORMANCE INTERNATIONAL SAS, Avignon (FR)

(*) Notice: Subject to any disclaimer, the term of this patent is extended or adjusted under 35 U.S.C. 154(b) by 526 days.

(21) Appl. No.: 18/036,464

(22) PCT Filed: Nov. 16, 2021

(86) PCT No.: PCT/EP2021/081863
§ 371 (c)(1),
(2) Date: May 11, 2023

(87) PCT Pub. No.: WO2022/106419
PCT Pub. Date: May 27, 2022

(65) Prior Publication Data

US 2023/0416152 A1 Dec. 28, 2023

(30) Foreign Application Priority Data

Nov. 17, 2020 (EP) .................................... 20306392

(51) Int. Cl.
*C04B 28/14* (2006.01)
*C04B 14/06* (2006.01)
(Continued)

(52) U.S. Cl.
CPC .............. *C04B 28/14* (2013.01); *C04B 14/06* (2013.01); *C04B 14/206* (2013.01); *C04B 14/22* (2013.01);
(Continued)

(58) Field of Classification Search
CPC ....... C04B 28/14; C04B 14/06; C04B 14/206; C04B 14/22; C04B 14/28; C04B 24/42;
(Continued)

(56) References Cited

U.S. PATENT DOCUMENTS 6,569,541 B1 * 5/2003 Martin .................... C04B 28/14 156/39
2003/0044630 A1 * 3/2003 Leclercq ................ C04B 28/14 428/688
2014/0121303 A1 * 5/2014 Hagen ..................... C04B 28/16 524/5

FOREIGN PATENT DOCUMENTS

DE 102011078531 A1 1/2013
DE 102014103253 A1 * 9/2015 ............... E06B 5/16
(Continued)

OTHER PUBLICATIONS

Machine English translation of Chuda Katarzyna, WO-2016146934-A1, Sep. 22, 2016. (Year: 2016).*
(Continued)

*Primary Examiner* — Pamela H Weiss
*Assistant Examiner* — Caroline D. Liott
(74) *Attorney, Agent, or Firm* — Dilworth & Barrese, LLP.; Michael J. Musella, Esq.

(57) ABSTRACT

The present invention concerns a plaster composition for manufacturing of a fire resistant plasterboard, said composition comprising hydratable calcium sulphate, water with a water/hydratable calcium sulphate ratio between 0.50 and 1.00 and the following components: –0.5-10 wt. % of SiO2
(Continued)

particles having a particle size distribution d50>10 μm; −2.5-10 wt. % of $CaCO_3$; −0.2-2.5 wt. % of polysiloxane wherein the wt. % are expressed relative to the weight of the hydratable calcium sulphate.

17 Claims, 1 Drawing Sheet

(51) Int. Cl.

| | |
|---|---|
| ***C04B 14/20*** | (2006.01) |
| ***C04B 14/22*** | (2006.01) |
| ***C04B 14/28*** | (2006.01) |
| ***C04B 24/42*** | (2006.01) |
| ***C04B 111/00*** | (2006.01) |
| ***C04B 111/28*** | (2006.01) |
| ***E04B 1/94*** | (2006.01) |

(52) U.S. Cl.
CPC .............. *C04B 14/28* (2013.01); *C04B 24/42* (2013.01); *E04B 1/942* (2013.01); *C04B 2111/0062* (2013.01); *C04B 2111/28* (2013.01)

(58) Field of Classification Search
CPC ......... C04B 2111/0062; C04B 2111/28; C04B 2111/00612; C04B 2111/10; C04B 28/145; E04B 1/942
See application file for complete search history.

(56) References Cited

FOREIGN PATENT DOCUMENTS

| | | | | | |
|---|---|---|---|---|---|
| EA | 2014/00102 | A1 | | 8/2014 | |
| EP | 0568519 | A2 | * | 11/1993 | ............. C04B 28/14 |
| EP | 0611735 | B1 | * | 5/1997 | ........... C04B 11/002 |
| EP | 3138826 | A1 | * | 3/2017 | ............. C04B 28/12 |
| FR | 515225 | A | | 3/1921 | |
| WO | 2016/079098 | A1 | | 5/2016 | |
| WO | WO-2016146934 | A1 | * | 9/2016 | ............. C04B 28/14 |
| WO | 2019/168464 | A1 | | 9/2019 | |
| WO | WO-2020125917 | A1 | * | 6/2020 | ........... C04B 28/182 |

OTHER PUBLICATIONS

Machine English translation of Schumchen Kurt, EP-3138826-A1, Mar. 8, 2017. (Year: 2017).*
Machine English translation of Enenkel Wolfgang Dipl-Ing, EP-0611735-B1, May 2, 1997. (Year: 1997).*
Machine English translation of Sturzenegger Philip, DE-102014103253-A1, Sep. 17, 2015. (Year: 2015).*

* cited by examiner

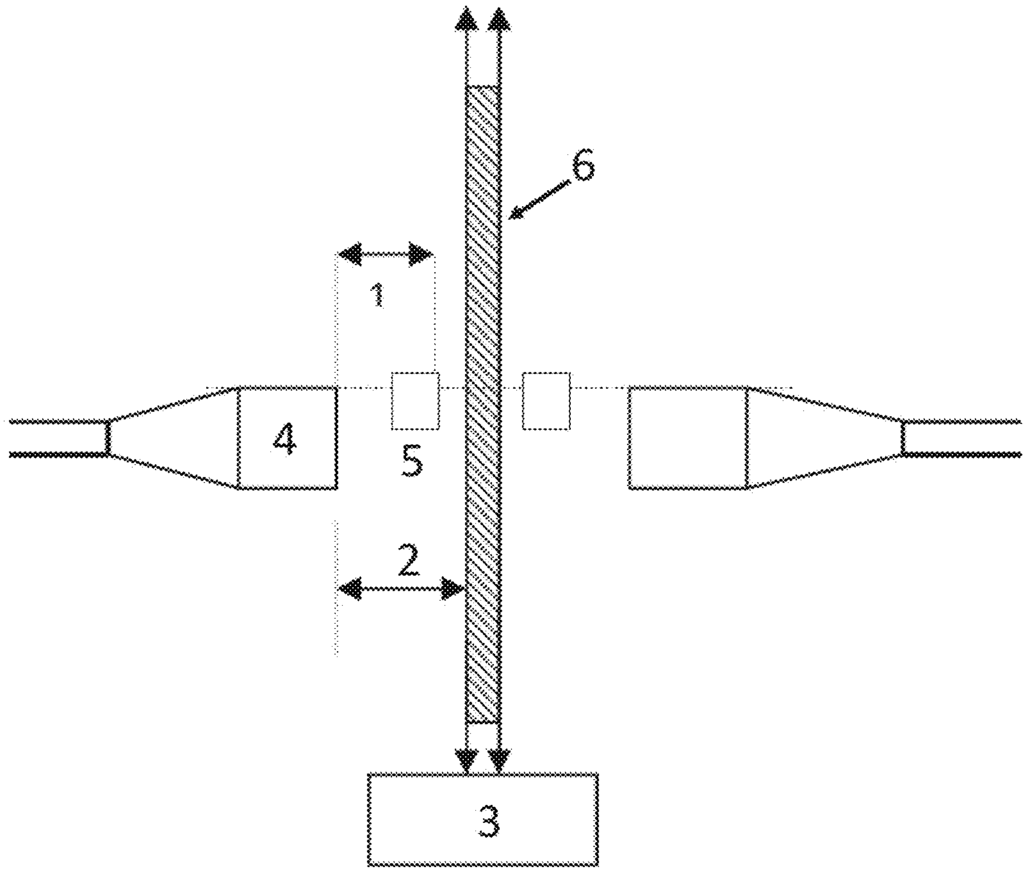
6
1
4
5
2
3

PLASTER COMPOSITION FOR FIRE RESISTANT PLASTERBOARD

FIELD OF THE INVENTION

Described herein are plaster compositions used for the manufacture of fire resistant plasterboard. Further described herein are plasterboards obtained using said plaster compositions, methods for the manufacture of said plasterboards and use of the plaster composition to reduce shrinkage while maintaining core cohesion.

BACKGROUND OF THE INVENTION

The fire resistance is a well-known topic in plasterboard, most of the time temperature below 1000 °C is targeted. There are however some specific applications which require relatively low shrinkage but with maintenance of mechanical performance up to 1050 °C A two layers partition can be used when a minimum time of resistance is required to a partition in case of fire. The partition wall comprises two layers of plasterboards. The position of the second layer of plasterboards is such that the joints between the plasterboards of the second layer are staggered compared to the joints between the plasterboards of the first layer. A first shrinkage of the layer facing the fire below 3% up to 800 °C followed by a shrinkage up to 13% at 1050 °C (measured by thermo mechanical analysis) is estimated to be promising as far as the plasterboard does not collapsed.

Another application requiring a minimum of shrinkage at a 1050 °C with a minimum resistance is the resistance of fire under the roof. In case of fire in the roof, the air over the plasterboard located under the roof is heated slowly. However, when an insulation layer lays on the plasterboard, the conductivity of the heat is drastically increased, and some parts of the plasterboard is then submitted to temperature up to 1050 °C! The plasterboard must then be able to resist a certain time before collapsing.

In order to assess the shrinkage of a plasterboard in a quick and reproducible way, the measurements were obtained by TMA on sample on samples of 8×8×18 $mm^3$, at a rate of 10 degree/min with a preload of 0.05N was used.

The structural integrity of the plasterboard is assessed by a structural core cohesion fall down test.

JPH1096279 proposes wollastonite which enable to produce high density plasterboard resisting then to a shrinkage at high temperature. The use of wollastonite is however to be avoided as impurities as asbestos could be present.

WO2016079098 describes a calcium sulphate-based product having reduced shrinkage after exposure to temperatures up to 1000 °C, comprising gypsum, a pozzolan source in an amount between 4-27 wt. % and a metal salt additive in an amount between 0.5 and 10 wt. %. The pozzolan source is selected from a kaolinitic clay material, fly ash, rice husk ash, diatomaceous earths, volcanic ashes and pumices, micro-silica, silica fume and silicone oil. The preferred metal salt additive being magnesium nitrate. Preferred concentrations of 4 wt. % of silicone oil as pozzolan source is expensive. Silicone oil as all polysiloxane is indeed subject to frequent variation of prices which is clearly dependent of the electronic industry demand on Silicon. In addition, high concentration of silicone oil has to be avoided as calcined PHMS releases formaldehyde. It is also known that high amount of silicone oil leads to a reduction of the efficiency of foaming.

A minimum of silicone oil or more generally polysiloxane (<2.5% relative to stucco weight) is then targeting.

EP3147268 deals with the shrinkage at a temperature of 850 °C. It was found that, the combination of added siloxane in an amount of 0.05 to 1% based on dry weight of the panel and added pregelled starch improved the shrinkage of the test samples.

WO2019168464 A1 also describes a fire-resistant panel comprising a gypsum board and low concentration of siloxane additive such as PHMS incorporated in the gypsum. Upon exposing the panel to sustained heating, the siloxane expands and fills void created by contraction of a core of the gypsum board.

FR 515 225 A describes a plaster composition for molding elements comprising stucco and carbonate. Only for external application Paris sand is used.

The benefit effect of PHMS and more broadly of siloxane additive is indeed observed around 800 °C but this benefit decreases when reaching 1000 °C There is then a need to find a cost efficiency solution for plasterboards which have a shrinkage below or equal to 3% at 800 °C and to 13% at 1050 °C while maintaining a good mechanical behavior.

SUMMARY OF THE INVENTION

The present inventors surprisingly found that the combination of $CaCO_3$, $SiO_2$, polysiloxane provide plasterboards which could withstand temperature up to 1050 °C by limiting the shrinkage while maintaining a structural core cohesion.

The present invention is defined herein. Preferred embodiments are also defined herein.

In particular, the present invention concerns a plaster composition for fire resistant plasterboard comprising hydratable calcium sulphate, water with a water/hydratable calcium sulphate ratio between 0.50 and 1.00 and the following components

- 0.5-10 wt. % of $SiO_2$ particles having a particle size distribution d50>10 μm
- 2.5-10 wt. % of $CaCO_3$
- 0.2-2.5 wt. % of polysiloxane wherein the wt. % are expressed relative to the weight of the hydratable calcium sulphate.

Preferably the plaster composition comprises hydratable calcium sulphate, water with a water/hydratable calcium sulphate ratio between 0.50 and 1.00 and the following components

- 2-7 wt. % of $SiO_2$ particles having a particle size distribution d50>10 μm
- 2-7 wt. % of $CaCO_3$
- 0.2-2.5 wt. % of polysiloxane wherein the wt. % are expressed relative to the weight of the hydratable calcium sulphate.

The plaster composition corresponds to a plaster composition comprising 100 parts of hydratable calcium sulphate and 50-100 parts of water and the above cited components.

$CaCO_3$ present in the composition may be in the form of limestone while $SiO_2$ may be in the form of quartz or ground amorphous glass.

The plaster composition comprises preferably more than 90 wt. % of hemi-hydrate calcium sulphate (HH), preferably more than 94 wt %, wt % based on the total weight of hydratable calcium sulphate, $SiO_2$, $CaCO_3$ and polysiloxane.

Preferably the plaster composition is free of vermiculite.

Usually the polysiloxane is liquid. However polysiloxane maybe solid under the form of particles having a granulometry below 3 mm and more preferably having a D90<2000 μm and measured by laser diffraction and wherein the concentration is between 1 and 2.5 wt. %; the wt. % are expressed relative to the weight of the hydratable calcium sulphate.

The polysiloxane can be defined by the SIO2- content of the polysiloxane part determined by X-Ray fluorescence which is ≥35 wt. % and preferably ≥45% based on the total weight of the polysiloxane Mica may be also present in the composition between 0.7-7.5 wt. % and preferably between 0.7-5 wt. % related to the weight of the hydratable calcium sulphate.

The present invention concerns a plasterboard obtained by setting of a plaster composition as described above and having a density >0.55.

The present invention also concerns a method for the manufacture of a plasterboard having a density >0.55, comprising the following steps:

(a) providing a plaster composition as defined supra
(b) forming said plaster composition into a plasterboard; and
(c) allowing said plasterboard to set The present invention also concerns a partition wall comprising two superimposed layers of plasterboards, one external and one internal wherein at least the external layer of plasterboard obtained by the method as defined supra.

Finally, the present inventions also concerns the use of a plaster composition as defined as supra for reducing the shrinkage during heat exposure at a temperature of up to 1050 °C of a plasterboard measured wherein the shrinkage is measured by TMA on sample on samples of 8×8×18 $mm^3$, at a rate of 10 degree/min with a preload of 0.05N while maintaining a structural core cohesion for at least 1.5 hour measured as described in the description.

BRIEF DESCRIPTION OF THE FIGURE

FIG. 1 shows a structural core cohesion fall down test.

DETAILED DESCRIPTION OF THE INVENTION

The present invention will be described with respect to particular embodiments.

When reference is made to weight percentage (wt. %), this is to be understood, unless differently specified, as the weight of the component expressed as percentage over the hydratable calcium sulphate of the composition in which the component is present.

The term "gypsum" as used herein refers to calcium sulfate dihydrate (DH), i.e. $CaSO4 \cdot 2H_2O$. Gypsum which is present in plasterboards typically is obtained via the hydration of plaster.

The term "plaster" or "stucco" as used herein and in the generally accepted terminology of the art, refers to a partially dehydrated gypsum of the formula $CaSOxH_2O$, where x can range from 0 to 0.6. The term "plaster" is also referred to herein as "hydratable calcium sulfate". The term "dry weight" when referred to plaster in a plaster composition, refers to the weight of the calcium sulfate including hydration water (i.e. the $xH_2O$ of the above formula), but excluding any gauging water in the composition. Plaster can be obtained via the calcination of gypsum, i.e. the thermal treatment of gypsum in order to remove (a part of) the combined water. For the preparation of plaster, natural or synthetic gypsum may be used. Natural gypsum may be obtained from gypsum rock or gypsum sand. Synthetic gypsum typically originates from flue gas desulfurization (FGD) or phosphoric acid production or can also be titanogypsum. More generally, synthetic gypsum can originate from any process comprising calcium sulfate production as a by-product.

The plaster contained in the plaster composition is a hydratable calcium sulfate, such as calcium sulfate hemihydrate (HH). Preferably, the plaster contains at least 70 wt. % calcium sulfate hemihydrate, or even at least 85 wt. % calcium sulfate hemihydrate. The calcium sulfate hemihydrate may be in its α or β form, and preferably in the β form. The plaster is typically provided in powder form, as is known in the art.

Plaster wherein x is 0.5 is known as "calcium sulfate hemihydrate" (HH) or "calcium sulfate semihydrate" (SH), i.e. $CaSO4.0.5H_2O$. Calcium sulfate HH can occur in different crystalline forms; known as a and β. Calcium sulfate HH is also known as "gypsum plaster" or "plaster of Paris".

Plaster wherein x is 0 is known as "calcium sulfate anhydrite" or "anhydrous calcium sulfate". "Calcium sulfate anhydrite III" (AIII) refers to a dehydrated HH with the potential of reversibly absorbing water or vapor. "Calcium sulfate anhydrite II" (AII) refers to the completely dehydrated calcium sulfate ($CaSO_4$). AII is formed at higher temperatures and is preferably not used for the preparation of plasterboard.

The terms "plasterboard" and "gypsum board" as used herein interchangeably and refer to a panel or board comprising a gypsum core, obtainable from a plaster slurry as described herein. Accordingly, the term "plasterboard" refers to a board or panel which is obtainable via the setting (hydration) of plaster. The term "board" or "panel" as used herein refers to any type of wall, ceiling or floor component of any required size.

The term Polysiloxane designates all polymeric organosilicon compounds containing Si—O—Si bonds and Si—C bonds. Especially polysiloxane formula is $$[R_nSiO_{((4-n)/2)}]_m$$

where n is 0-3 and m is larger than 2, preferably larger than 20, preferably larger than 40 and preferably larger than 200 before or after mixture with plaster and gauging water. R can be Hydrogen or organic group, indifferently methyl or phenyl groups or a mixture of both.

For the reason exposed above, the concentration of polysiloxane was limited to a maximum of 2.5 wt. %. The composition comprises between 0.2 up to 2.5 wt. %, preferably up to 2 wt % of polysiloxane based on the hydratable calcium sulphate.

The most commonly polysiloxane used are methylhydrogen polysiloxane (PHMS) or dimethyl polysiloxane (PDMS). Suitable PHMS are Xiameter MHX 1107 sold by Dow Chemical Company SILRES BS94 sold by Wacker-Chemie GmbH. A suitable PDMS is Dowsil 3-0133 sold by Dow Chemical Company.

Besides common polysiloxane, recycled polysiloxane can also be used: the polysiloxane are either liquid or solid having a granulometry below 3 millimetres. The granulometry is measured by microscope and image analysis. Preferably the solid polysiloxane has a D90 below or equal 2000 μm. D90 being the particle size distribution D90 which represents the particle diameter corresponding to 90% cumulative (from 0 to 100%) undersize particle size distribution. It is measured by a laser diffraction method.

Solid polysiloxane can be Silicone elastomers and silicone rubbers, composed of high molecular weight silicone polymers such as dimethylsiloxanes, methylpheylsiloxanes, methylvinylsiloxanes, fluorovinylmethylsiloxanes or fluoroalkylsiloxanes. Polysiloxane comprises Polysiloxane-organic copolymer.

When polysiloxane are originated from silicone rubbers, fillers can be present.

Any form of polysiloxane or recycled polysiloxane can be suitable provided that the SIO2- content of the polysiloxane determined by X-Ray fluorescence is comprised:

between 35 wt. % and 94 wt. % based on the total weight of the polysiloxane preferably 45 wt. % and 94 wt. % most preferably 75 wt. % and 94 wt. %

Table 1 gives typical characteristics of solid recycled polysiloxanes.

TABLE 1

| | Polysilox 1 | Polysilox 2 |
|---|---|---|
| SiO2 content | 46% | 59% |
| D10 | | 40 |
| d50 | | 94 |
| D90 | | 2000 |
| Granulometry | <800 μm | <3000 μm |

The composition also comprises CaCO3 preferably under the form of limestone. A suitable Calcium carbonate is Mikhart 10 sold by La Provençale having a purity of at least 98% % and a granulometry below 50 μm and a d50 of 10 μm.

The range of the concentration is between 2.5 and 10 wt. %, preferably up to 7 wt. % based on the hydratable calcium sulphate. A maximum should be below 10 wt. % in order to not impact drastically the mechanical resistance at room temperature and avoiding then the use of an increase of polysiloxane.

SiO2 particles have a particle size distribution d50>10 μm. It was observed that Fume silica was not suitable. Quartz or amorphous ground recycled glass/ground recycled fibre glass are used. Particle Size Distribution d50 is also known as the median diameter or the medium value of the particle size distribution, it is the value of the particle diameter at 50% in the cumulative distribution. It is measured by a laser diffraction method.

A suitable quartz is C400 sold by Sibelco.

The range of concentration of SiO2 is between 0.5-10 wt. % based on hydratable calcium sulphate weight.

Mica can be optionally used if further mechanical resistance at high temperature is required. Between 7.5 wt. % of mica and preferably between 0.7-5 wt. % of mica related to the weight of the hydratable calcium sulphate are used. More preferably mica under the form of Muscovite particle having a d50 between 40 and 70 μm is used.

The plaster composition has a water/hydratable calcium sulphate ratio between 0.50 and 1.00. The water/hydratable calcium sulphate ratio refers to the weight of water in the plaster composition divided by the dry weight of hydratable calcium sulphate in the plaster composition. In preferred embodiments, the plaster composition described herein has a water/hydratable calcium sulphate ratio below 0.80. In further embodiments, the plaster composition has a water/hydratable calcium sulphate ratio below below 0.70, below 0.65, or even below 0.60. When a low water/hydratable calcium sulphate ratio is desired, the plaster composition will typically comprise a fluidizer, as is known in the art.

The plasterboards have a density varying between 0.55 to 0.92 corresponding to a 12.5 mm plasterboard which weights between 7-11.5 kg/m$^2$.

Preferably, the plaster composition contains no vermiculite.

Preferably, the method for the manufacture of a plasterboard having a density >0.55, comprises the following steps:

(a) providing a plaster composition as defined supra (b) forming said plaster composition into a plasterboard; and (c) allowing said plasterboard to set;

Wherein the forming step (b) comprises the following steps:

providing a first facing sheet;

pouring the plaster composition over the first facing sheet;

providing a second facing sheet over.

The plasterboards are used inside a building.

EXPERIMENTAL

Different formulations of plaster composition were prepared as shown in Tables 2-4.

The composition of the plaster respects a water/hydratable calcium sulphate ratio of 0.70 and was poured in molds to produce cubic samples of 5×5×5 cm$^3$ which were then dried at 50 °C until the sample reaches a constant weigh and stored at room temperature (20 °C+/−1 °C, HR: 65%). Other additives may have been added to these formulations, without being essential to the findings of the present invention. The % are wt % relative weight of hydratable calcium sulphate The shrinkage is firstly assessed by a Thermo Mechanical Analysis (TMA) measurement. TMA was conducted with the TMA model 1100/132 distributed by METTLER TOLEDO on samples of 8×8×18 mm$^3$. A rate of 10 degree/min with a preload of 0.05N was used.

EX1: Liquid polysiloxane

TABLE 2

| | 1 | 2 | 3 | 4 | 5 | 6 |
|---|---|---|---|---|---|---|
| | Composition | | | | | |
| Temperature (C.) | REF Stucco 1 | 2.44% PDMS | 5% C400 5% Mikhart10 | 2.44% PDMS 10% C400 10% Mikhart10 | 2.44% PDMS 5% E400 5% Mikhart10 | 0.6% PDMS 5% E400 5% Mikhart10 |
| 800 | −6.19% | −2.20% | −4.55% | −1.68% | −1.74% | −1.96% |
| 1050 | −12.01% | −11.53% | −10.91% | −9.8% | −9.84% | −9.46% |

PDMS: dimethylpolysiloxane Dowsil 3-0133

C400: quartz

Mikhart10: CaCO3

The use of a polysiloxane impacts the shrinkage at 800 °C when comparing with the reference stucco without polysiloxane. Adding SiO2 and CaCO3 in the reference stucco improves slightly the shrinkage at 800° as well as at 1050 °C. The combination of PDMS/SIO2/CaCO3 improves drastically the shrinkage at 800 °C but also at 1050 °C. What was more surprising is that the same shrinkage is obtained by lowering drastically (by a factor of 4) the amount of polysiloxane used!

This improvement was also obtained with 0.25 wt. % of PHMS with another stucco: plaster 2

TABLE 3

| Temperature ° C. | 7 ref Plaster 2 | 8 0.75% PHMS | 9 0.25% PHMS 3.3% CaCO3 3.3% SiO2 |
|---|---|---|---|
| 800 | 4.28% | 2.36% | 3.0% |
| 1050 | 13.99% | 13.6% | 8.6% |

EX2. Solid polysiloxane and substitution of Quartz by Ground Glass Fibre

Lab test were carried out using a third stucco to produce small plasterboards (0.1 $m^2$) having a weight of 11.0 $kg/m^2$ (d=0.88). The composition of the plaster respects a water/hydratable calcium sulphate ratio of 0.80. Samples were prepared from the plaster composition according to the recipes set out in Table 4. The amounts of the additives are given as a wt. % relative to the hydratable calcium sulphate weight. Other additives may have been added to these formulations, without being essential to the findings of the present invention. The plaster composition was cast between two layers of paper.

TABLE 4

| | PHMS | Sol PolySilox1 | Sol PolySilox2 | E400/ SI02 | Ground Glass Fibre | Mik40 CACO3 |
|---|---|---|---|---|---|---|
| PRM011 REF | 0.5% | | | | | |
| PRM012 | 0.5% | | | 5.0% | | 5.0% |
| PRM013 | 0.5% | | | | 5.0% | 5.0% |
| PRM014b | | 1.5% | | 5.0% | | 5.0% |
| PRM015 | | 1.5% | | | 5.0% | 5.0% |
| PRM017 REF | | | 2.0% | | | |
| PRM018 | | | 2.0% | 5.0% | | 5.0% |
| PRM019 | | | 2.0% | | 5.0% | 5.0% |

The shrinkage was assessed by a Thermo Mechanical Analysis (TMA) measurement on samples of 8×8×18 $mm^3$. A rate of 10 degree/min with a preload of 0.05N was used.

TABLE 5

| | TMA shrinkage at 800° C. | TMA shrinkage at TMA 1050° C. |
|---|---|---|
| PRM011 REF | 2.33% | 17.02% |
| PRM012 | 2.34% | 10.53% |
| PRM013 | 2.66% | 9.16% |
| PRM014b | 2.28% | 11.09% |
| PRM015 | 2.46% | 8.85% |
| PRM017 REF | 2.24% | 13.42% |
| PRM018 | 1.93% | 9.87% |
| PRM019 | 2.49% | 9.06% |

The target of a shrinkage below or equal to 3% at 800 °C and below 13% at 1050 °C was obtained by using polysiloxane (liquid or solid) in combination with quartz or ground glass fiber and limestone.

EX3. Structural Core Cohesion

A fourth stucco was used to produce some plasterboards having a weight of 11.3 $kg/m^2$ (d=0.90). The composition of the plaster respects a water/hydratable calcium sulphate ratio of 0.70. They were prepared from the plaster composition according to the recipes set out in Table 6. The amounts of the additives are given as weight % relative to Calcium Sulphate hemihydrate (HH) weight. Other additives may have been added to these formulations, without being essential to the findings of the present invention. The plaster composition was cast between two layers of paper.

TABLE 6

| | | PRM 020 ref | PRM 025 |
|---|---|---|---|
| Polysilox 1 | %/HH | | 1.5% |
| Quartz | %/HH | 3.0% | 5.0% |
| CaCO3 | %/HH | 2.0% | 5.0% |
| Vermiculite | %/HH | 4.0% | |
| Glass Fiber | %/HH | 0.4% | 0.4% |

The reference is a plaster composition typically used to manufacture fire resistant plasterboard, the plaster composition comprises 4 wt. % vermiculite and 0.4 wt. % of glass fiber, the % are wt. % expressed relative to the weight of the Calcium sulphate hemihydrate.

The shrinkage was assessed by a Thermo Mechanical Analysis (TMA) measurement on samples of 8×8×18 $mm^3$. A rate of 10 degree/min with a preload of 0.05N was used.

TABLE 7

| | | PRM 020 | PRM 025 |
|---|---|---|---|
| Shrinkage TMA 800° C. | % | −0.94% | −1.69% |
| Shrinkage TMA 1050° C. | % | −11.3% | −12.24% |

As expected, the plasterboard of the present invention and the comparative plasterboard comprising vermiculite shows a shrinkage is below 12.5% at 1050 °C However, another important parameter to take into account is the integrity of the plasterboard exposed at high temperature.

The integrity of the plasterboard was assessed by a structural Core cohesion fall down test.

The structural core cohesion of the plasterboard when exposed to fire is assessed according to 8.3.6 paragraph of DIN 18180-1989 with the following modifications:

Temperature of each burner was adjusted to 1020 °C±20 °C

A load of 1000 g was applied at the bottom part of each sample test was stopped after the fall-down of each sample. Time before the fall-down was recorded 3 samples were tested each time.

The test can be described as following:

Three samples (6) of 300 mm (+/−5 mm)×50 mm (+/−1 mm) are cut according to the Machine Direction. The samples are then conditioned in a ventilated heated cabinet et 40 °C+/−4° for at least four hours.

FIG. 1 shows the structural core cohesion est. The sample (6) is then centred between two Juchheim Meker burners type 1436P (4) and positioned at 25 mm of the sample surface. The burners simulate the fire exposure. The test temperature is 1020 °C±20 °C measured by thermocouples (5) positioned at a distance of 15 mm from the burner (4) and 10 mm from the sample surface.

A tensile force is applied to a vertical sample by applying a load (3) of 1000 g at the bottom of the sample. On heating the stress causes the sample to break.

The length of time required to break the sample is recorded. The test is repeated on three samples and the shortest recorded time sets in Table 8.

TABLE 8

| | | PRM 020 | PRM 025 |
|---|---|---|---|
| Core cohesion fall down | hours min | <10 minutes | >1 hr 30 min |

The comparative example is a plasterboard comprising vermiculite and glass fibres which is a current recipe for fire resistance. Glass fiber is required to maintain a core cohesion according to DIN 18180-1989. Due to high temperature applied, the sample breaks only after 10 minutes. In the present invention even in presence of low amount of glass fiber (0.4 wt %), the sample breaks only after 1 h30!

The combination of silicone/CaCO3/SiO2 not only restricts the shrinkage at high temperature but improves the structural core cohesion of the board.

| REF | DESCRIPTION |
|---|---|
| 1 | Distance between the burner and the sample |
| 2 | Distance between the burner and the thermocouple |
| 3 | Load (1 kg) |
| 4 | Burner |
| 5 | Thermocouple |
| 6 | Sample |

The invention claimed is:

1. A plaster composition for fire resistant plasterboard, comprising hydratable calcium sulphate, water with a water/hydratable calcium sulphate ratio between 0.50 and 1.00, and the following components, 0.5-10 wt. % of SiO2 particles having a particle size distribution d50>10 μm, 2.5-10 wt. % of CaCO3, and 1.2-2.5 wt. % of polysiloxane, wherein the wt. % of the SiO2 particles, the CaCO3, and the polysiloxane is relative to the weight of the hydratable calcium sulphate, and wherein the water/hydratable calcium sulphate ratio is the weight of water in the plaster composition divided by the dry weight of the hydratable calcium sulphate in the plaster composition.

2. The plaster composition according to the claim 1, wherein the SiO2 has the following concentration, 2-7 wt. % of SiO2 particles having a particle size distribution d50>10 μm, wherein the wt. % of the SiO2 particles is relative to the weight of the hydratable calcium sulphate.

3. Plaster composition according to claim 1, wherein CaCO3 is in the form of limestone.

4. Plaster composition according to claim 1, wherein SiO2 is in the form of quartz.

5. Plaster composition according to claim 1, wherein SiO2 is in the form of ground glass.

6. The plaster composition according to claim 1, wherein more than 90 wt. % of hem i-hydrate calcium sulphate (HH) based on the total weight of hydratable calcium sulphate, SiO2, CaCO3 and polysiloxane, is present in the plaster composition.

7. The plaster composition according to claim 6, wherein more than 94 wt. % of hemi-hydrate calcium sulphate (HH), based on the total weight of hydratable calcium sulphate, SiO2, CaCO3 and polysiloxane, is present in the plaster composition.

8. The plaster composition according to claim 1, free of vermiculite.

9. The plaster composition according to claim 1, wherein the polysiloxane is liquid.

10. The plaster composition according to claim 1, wherein the polysiloxane is solid in the form of particles having a granulometry below 3 mm, and the concentration is between 1 and 2.5 wt. %.

11. The plaster composition according to claim 10, wherein the SiO2 content of the polysiloxane determined by X-Ray fluorescence is ≥35 wt. %, based on the total weight of the polysiloxane.

12. The plaster composition according to claim 1, wherein mica is present in the plaster composition between 0.7-7.5 wt. %, and the wt. % is relative to the weight of the hydratable calcium sulphate.

13. The plaster composition according to claim 12, wherein mica is present in the plaster composition between 0.7-5 wt. %, and the wt. % is relative to the weight of the hydratable calcium sulphate.

14. A plasterboard comprising a gypsum core obtainable by setting of a plaster composition according to claim 1, and wherein the density is >0.55.

15. A method for the manufacture of a plasterboard having a density >0.55, comprising the following steps:

(a) providing a plaster composition according to claim 1;

(b) forming said plaster composition into a plasterboard; and (c) allowing said plasterboard to set.

16. A partition wall comprising two superimposed layers of plasterboards, one external layer and one internal layer, wherein at least the external layer of plasterboard is obtained by the method for the maufacture of the plasterboardof claim 15.

17. The method for the manufacture of the plasterboard of claim 15, comprising an additional step of reducing the shrinkage during heat exposure at a temperature of up to 1050 °C of a plasterboard, the shrinkage being is measured by Thermo Mechanical Analysis (TMA) on samples of $8 \times 8 \times 18$ $mm^3$, at a rate of 10 degree/min with a preload of 0.05 N while maintaining a structural core cohesion for at least 1.5 hour.

* * * * *